United States Patent [19]

Gonzalez et al.

[11] Patent Number: 4,728,518

[45] Date of Patent: Mar. 1, 1988

[54] METHOD FOR DEVELOPING A RED COLOR IN CURED MEAT

[75] Inventors: Carlos F. Gonzalez, College Station, Tex.; Mark A. Matrozza, Sarasota, Fla.; Kelly B. Pratt, Neustradt, Fed. Rep. of Germany

[73] Assignee: Microlife Technics, Inc., Sarasota, Fla.

[21] Appl. No.: 877,233

[22] Filed: Jun. 23, 1986

[51] Int. Cl.$^4$ .............................................. A23L 1/31
[52] U.S. Cl. ...................................... 426/56; 426/59; 426/61; 426/262; 426/332
[58] Field of Search ................. 426/55, 56, 58, 59, 426/61, 262, 265–266, 268, 260, 331, 332, 531–532, 641, 644, 646, 647, 654, 7; 435/253, 42, 68–69, 139, 859, 822, 885

[56] References Cited

U.S. PATENT DOCUMENTS

| | | | |
|---|---|---|---|
| 3,561,977 | 2/1971 | Rothchild et al. | 99/109 |
| 3,814,817 | 6/1974 | Everson et al. | 426/56 |
| 4,013,797 | 3/1977 | Gryczka | 426/56 |
| 4,172,899 | 10/1979 | Vedamuthu | 426/38 |
| 4,191,782 | 3/1980 | Vedamuthu | 426/38 |
| 4,303,679 | 12/1981 | Raccach | 426/59 |
| 4,304,868 | 12/1981 | Gryczka et al. | 435/253 |
| 4,407,828 | 10/1983 | Raccach | 426/56 |
| 4,452,895 | 6/1984 | Gonzalez | 435/253 |
| 4,477,471 | 10/1984 | Gonzalez | 426/43 |
| 4,508,738 | 4/1985 | Gonzalez | 426/55 |

OTHER PUBLICATIONS

Reddy et al., Journal of Food Science 35, 787–791, (1970).

*Primary Examiner*—Raymond N. Jones
*Assistant Examiner*—Marianne M. Cintins
*Attorney, Agent, or Firm*—Ian C. McLeod

[57] ABSTRACT

*Streptococcus lactis* subsp. *diacetilactis* mixed with nitrate reducing bacteria are used to produce a red color in cured meats. The meats contain a food grade preservative selected from nitrite, nitrate and mixtures thereof which allow the development of the red color in the meat.

12 Claims, No Drawings

METHOD FOR DEVELOPING A RED COLOR IN CURED MEAT

BACKGROUND OF THE INVENTION (1) Field of the Invention

The present invention relates to a method for developing a uniform red color in cured meat, particularly fermented meats containing nitrate and/or nitrite. In particular, the present invention uses (a) a nitrate reducing bacteria, particularly Micrococcus, and (b) a *Streptococcus lactis* subspecies *diacetylactis* which acts in the presence of nitrite produced by a reduction of food grade nitrate to develop a cured red color. The *Streptococcus lactis* subspecies *diacetylactis* produces a red color in the meat at an early stage of the cure in the presence of nitrite without significant drop in pH (development of acid). The nitrite can be supplied by the nitrate reducing bacteria. Further development of the cured red color at a late stage of the cure is intensified by a reduction in pH by a lactic acid producing culture.

(2) Prior Art

The use of lactic acid producing *Streptococcus lactis* cultures to inhibit spoilage bacteria in ground meat is described by Reddy, S. G. et al in Journal of Food Science 35, 787–791 (1970). *Streptococcus lactis* subspecies *diacetylactis* strain is disclosed along with the suggestion that this subspecies generates an inhibitory substance which inhibits spoilage microorganisms. Ascorbic acid was added with the cultures of *Streptococcus lactis* to maintain the appearance of the ground meat which tended to oxidize to a brown color. The brown color is regarded by the consumer as an indication of a lack of freshness. When lactose was added to the cultures the inhibitory affect was increased, most likely because of the generation of lactic acid by the *Streptococcus lactis* from the lactose. Thus to a significant extent the inhibition achieved by Reddy et al are attributed to the lactic acid producing capabilities of the strains of *Streptococcus lactis* used. No edible nitrite was added to the meat and thus no cured red color was developed.

U.S. Pat. No. 3,814,817 to Everson et al describes the use of mixtures of lactic acid producing bacteria and *Streptococcus diacetilactis* in fermenting meat in the presence of food grade nitrite or nitrate. This patent suggests that it is desirable to maintain the natural cure color of the meat without any further discussion. U.S. Pat. No. 3,561,977 to Rothchild et al generally describes meat fermenting processes using lactic acid producing bacteria.

U.S. Pat. No. 4,477,471 to Gonzalez describes strains of *Streptococcus lactis* subspecies *diacetylactis* which lack the ability to produce lactic acid from lactose but which continue to generate an inhibitory substance effective against food spoilage microorganisms. The strains have been "cured" to rmove a 41 Mdal plasmid which encodes for lactic acid production from lactose while retaining the ability to produce the inhibitory substance. These strains are described as being useful in milk fermentations; however, there is no suggestion that they would be useful in curing meat.

The development of a cured red color in meat is very desirable. This prevents the dark brown color which the consumer regards as spoilage. U.S. Pat. No. 4,304,868 to Gryczka and Shah describe the use of *Micrococcus varians*, particularly NRRL-B-15,306, with lactic acid producing bacteria to develop a cured red color from nitrite and/or nitrate. Bacteria such as Micrococcus sp. NRRL-B-8048, as described in U.S. Pat. No. 4,013,797 to Gryczka are known to reduce nitrate or nitrite to develop the cured red color in meat. As far as is known, the use of *Streptococcus lactis* subspecies *diacetilactis* with a nitrate reducing bacteria to develop a cured red color in meat is unknown. The reason is that *Streptococcus lactis* subspecies *diacetylactis* is not used commercially in meat fermentations and it is believed that the use of this species to develop an early red color in meat in the presence of a food grade nitrite is unknown.

OBJECTS

It is therefore an object of the present invention to provide a method for producing a cured red color in meat and also producing an inhibitory substance in the meat using an admixture of *Streptococcus lactis* subspecies *diacetylactis* and a nitrate reducing bacteria. In particular the present invention relates to a fermentation method which produces a cured red color in meat containing a food grade nitrite and/or nitrate. These and other objects will become increasingly apparent by reference to the following description.

GENERAL DESCRIPTION

The present invention relates to an improved method for curing meat by inoculating the meat with a bacteria which in the presence of a food grade preservative selected from nitrite, nitrate and mixtures thereof develops a cured red color in the meat which comprises inoculating the meat with a *Streptococcus lactis* subspecies *diacetylactis* and a nitrate reducing bacteria in the presence of an effective amount of the food grade preservative to develop the cured red color.

Further the present invention relates to an improved method for curing and fermenting meat by inoculating the meat containing a food grade preservative selected from nitrite, nitrate and mixtures thereof with lactic acid producing bacteria to reduce the pH of the meat which comprises inoculating the meat with a mixture of the lactic acid producing bacteria, a *Streptococcus lactis* subspecies *diacetylactis* and a nitrate reducing bacteria in the presence of an effective amount of the preservative so that the meat develops a cured red color while the meat is fermenting to reduce the pH.

The *Streptococcus lactis* subspecies *diacetylactis* develops an early red color in the meat without any pH reduction which is desirable from a processing point of view. The nitrate reducing bacteria develop a late red color particularly as the pH of the meat is reduced by fermentation. The reason for the early color development is uncertain; however, the presence of food grade nitrite is necessary. The nitrate reducing bacteria reduce any nitrate to a nitrite and the *Streptococcus lactis* subspecies *diacetylactis* act in the presence of the nitrite to develop the red color. The combination of those bacteria provides a reliable and desirable cured red color in the meat.

Various known strains of *Streptococcus lactis* subspecies *diacetylactis* can be used in the present invention, particularly ATCC 15346. Also the strains described in U.S. Pat. Nos. 4,172,899 and 4,191,782 to Vedamuthu can be used.

U.S. Pat. No. 4,477,471 to Gonzalez describes the various lactose negative (lac⁻) strains of *Streptococcus lactis* subspecies *diacetylactis* (also known as *Streptococ-* cus diacetylactis) which are preferably used in the present invention. A lactose positive strain (lac+) is used to produce the lactose negative (lac−) strain by various means usually by the removal of a plasmid, although the trait can be encoded for by a gene on a chromosome and can be removed by curing techniques. The removal of a 41 Mdal plasmid from ATCC 15346 produces a preferred lac− strain. The most preferred strain is lac−cit− strain *Streptococcus lactis* subspecies *diacetylactis* NRRL-B-15006. In this instance a 5.5 Mdal plasmid has been removed which encodes for citrate utilization. Also the nisin producing strains of *Streptococcus lactis* subspecies *diacetylactis* described in U.S. patent application Ser. No. 529,614 filed Sept. 6, 1983 can also be used in countries where nisin is allowed in foods. The preferred strains of *Streptococcus lactis* subspecies *diacetylactis* produce an inhibitory substance against gram negative bacteria (psychotrophs) which are food spoilage microorganisms.

In producing fermented meat products, *Streptococcus lactis* subspecies *diacetylactis* is mixed with a lactic acid producing bacteria conventionally used for meat fermentations and with a nitrate reducing bacteria. Lactic acid producing bacteria include for instance *Lactobacillus plantarum* as described in U.S. Pat. No. 3,814,817 to Everson, et al particularly NRRL-B-5461; *Pediococcus pentosaceus* particularly NRRL-B-11465 as described in U.S. Pat. Nos. 4,303,679 to Raccach, 4,452,895 to Gonzalez; and 4,508,738 to Gonzalez; *Pediococcus cerevisiae*, particularly NRRL-B-5677, as described in U.S. Pat. No. 3,561,977 to Rothchild and Olsen and; *Lactobacillus casei* NRRL-B-12344 as described in U.S. Pat. No. 4,407,828 to Raccach. *Micrococcus varians* NRRL-B-18051 (M-19) which is described hereinafter for nitrate reduction is freely available from the Northern Regional Research Laboratory in Peoria, Ill. upon request by name and access number. Other prior art nitrate reducing bacteria have already been described.

The *Streptococcus lactis* subspecies *diacetilactis* and lactic acid producing bacteria are preferably used in a cell count ratio of between about 10 to 1 and 1 to 10, respectively. The *Streptococcus lactis* subspecies *diacetylactis* and nitrate reducing bacteria are preferably used in a cell count ratio of between about 1 to 10 and 10 to 1, respectively. Any ratio which is effective to develop the cured red color in the meat can be used. The food grade nitrite or nitrate or mixtures thereof is preferably present in an amount between about 1 and 200 ppm. In the United States the maximum amount of food grade nitrite as sodium nitrate is 156 ppm.

The bacteria can be cultured to a level of about $1 \times 10^8$ cells per ml or higher and concentrated up to about $10^{14}$ cells per ml. The cells can be preserved with a preservation agent and lyophilized or frozen. All of this is well known to those skilled sin the art.

SPECIFIC DESCRIPTION

Example 1

The meat formulation was for pepperoni and was as follows:
All pork (Boston Butt), comminuted, fat content 28-30%;
1.0% dextrose;
3.3% NaCl;
156 ppm NaNO$_2$;
0.003% BHA;
0.003% BHT; and
0.003% Citric Acid
where the percentages are by weight.

The cultures used were:
*Streptococcus lactis* subsp. *diacetilactis* NRRL-B-15006
*Pediococcus pentosaceus* NRRL-B-11465*

*(Commercial meat fermenting culture which reduces the pH of the meat formulations by forming lactic acid from dextrose.) The *Micrococcus varians* NRRL-B-18051 was used at a level of $5 \times 10^7$ cells per gram of meat. The *Streptococcus lactis* subspecies *diacetilactis* was used at $8 \times 10^6$, $2 \times 10^7$ and $5 \times 10^7$ cells per gram of meat with equivalent results.

*Micrococcus varians* NRRL-B-18051 (M19) was used to reduce sodium nitrate (156 ppm) to nitrite so that *Streptococcus lactis* subspecies *diacetylactis* NRRL-B-15006 can develop a red color from the nitrite as shown in Table I.

TABLE I

Nitrate Cure
A. NRRL-B-18051 and NRRL-B-15006

|  | 15006 | 18051 | 15006 + 18051 |
|---|---|---|---|
| Sodium nitrate (156 ppm) | 1+ | 2+ | 4+ |
| Sodium nitrite (156 ppm) | 4+ | 2+ | 4+ |

21 hr 24° C. no pH drop by 18051 or 15006
Color Rating
0 - No color - Brown
1+ Reddish Brown
2+ Light red
3+ Red
4+ Bright red cured color It was concluded that *Micrococcus varians* NRRL-B-18051 did not produce very good color alone with either nitrate or nitrite. *Streptococcus lactis* subspecies *diacetylactis* did produce a good early color alone in the presence of nitrite and in the presence of nitrate when *Micrococcus varians* was present to reduce nitrate to nitrite. *Streptococcus lactis* subspecies diacetylactis did produce a good color alone.

In order to obtain a pH reduction, *Pediococcus pentosaceus* NRRL-B-11465 was used as shown in Table II. The cell count of the *Pediococcus pentosaceus* was about $4 \times 10^7$ cells per gram of meat.

TABLE II

B. Fermentation With Nitrate Alone
NRRL-B-15006 and 18051 and NRRL-B-11465

|  | 11465 | 18051 | 18051 + 11465 | 18051 + 11465 + 15006 |
|---|---|---|---|---|
| Color | 0 | 1.5+ | 2.5+ | 3+ |
| pH | 4.81 | 5.41 | 4.85 | 4.71 |
| Time | 24 hr | 24 hr | 24 hr | 24 hr |

NaNO$_3$ 156 ppm
Temp 73° F.
0 hr pH = 6.10

As can be seen from Example 1, *Micrococcus varians* NRRL-B-18051 reduces the sodium nitrate to nitrite so that NRRL-B-15006 can use it to develop color without a significant reduction in pH. In order to obtain a pH reduction *Pediococcus pentosaceus* NRRL-B-11465 or another lactic acid producing culture must be used.

A food grade citrate salt is conventionally used in meats to further accentuate the cured red color. Since the preferred *Streptococcus lactis* subspecies *diacetylactis* NRRL-B-15006 does not utilize citrate it is preferred for this further reason. Also, *Streptococcus lactis* subspecies *diacetylactis* NRRL-B-15006 does not metabolize lactose and will therefore not ferment the carbohydrate in milk solids which may be used as fillers in meat.

It is intended that the foregoing description only be illustrative of the present invention and that the invention be limited by the hereinafter appended claims.

We claim:

1. In a method for curing meat by inoculating the meat with a bacterium which in the presence of a food grade preservative selected from the group consisting of nitrite, nitrate and mixtures thereof develops a cured red color in the meat the improvement which comprises inoculating the meat with an effective number of cells of a mixture of a *Streptococcus lactis* subspecies *diacetilactis* and a nitrate reducing bacterium in the presence of an effective amount of the food grade preservative to develop the red color, wherein the mixture develops the cured red color in the meat earlier than with the nitrate reducing bacterium alone.

2. The method of claim 1 wherein the *Streptococcus lactis* subspecies *diacetilactis* is ATCC 15346 or a derivative thereof with a 41 Mdal plasmid removed which lacks the ability to ferment lactose to lactic acid.

3. The method of claim 2 wherein in addition a 5.5 Mdal plasmid is removed from ATCC 15346 so that the strain lacks the ability to ferment citrate.

4. The method of claim 1 wherein the *Streptococcus lactis* subspecies *diacetilactis* is NRRL-B-15006.

5. The method of claim 2 wherein the nitrate reducing Micrococcus is *Micrococcus varians* NRRL-B-18051.

6. In a method for curing and fermenting meat by inoculating the meat containing a food grade preservative selected from the group consisting of nitrite, nitrate and mixtures thereof with cells of a lactic acid producing bacterium and fermenting the meat to reduce the pH of the meat the improvement which comprises inoculating the meat with a mixture of an effective number of cells of the lactic acid producing bacterium, a *Streptococcus lactis* subspecies *diacetilactis* and a nitrate reducing bacterium in the presence of an effective amount of the preservative and fermenting the meat so that the meat develops a cured red color while the meat is fermenting to reduce the pH wherein the mixture develops the cured red color in the meat earlier than the bacterium alone or with the lactic acid producing bacterium.

7. The method of claim 6 wherein the *Streptococcus lactis* subspecies *diacetilactis* is ATCC 15346 or a derivative thereof with a 41 Mdal plasmid removed which lacks the ability to ferment lactose to lactic acid.

8. The method of claim 7 wherein in addition a 5.5 Mdal plasmid is removed from the *Streptococcus lactis* subspecies *diacetylactis* or with the lactic acid producing bacteria so that the strain lacks the ability to ferment citrate.

9. The method of claim 1 wherein the *Streptococcus lactis* subspecies *diacetilactis* is NRRL-B-15006.

10. The method of claim 1 wherein the food grade preservative is sodium nitrite.

11. The method of claim 1 wherein the meat contains a nitrate which is reduced to a nitrite by the nitrate reducing bacterium.

12. The method of claim 11 wherein the nitrate reducing bacterium is *Micrococcus varians* NRRL-B-18051.

* * * * *

UNITED STATES PATENT AND TRADEMARK OFFICE
CERTIFICATE OF CORRECTION

PATENT NO. : 4,728,518  Page 1 of 2

DATED : March 1, 1988

INVENTOR(S) : Carlos F. Gonzalez, Mark A. Matrozza and Kelly B. Pratt

It is certified that error appears in the above—identified patent and that said Letters Patent is hereby corrected as shown below:

Column 1, line 45 "diacetilactis" should be --diacetylactis--.

Column 1, line 57 "rmove" should be --remove--.

Column 2, line 6, "diacetilactis" should be --diacetylactis--.

Column 3, line 39, "diacetilactis" should be --diacetylactis--.

Column 3, line 55 "sin" should be --in--.

Column 4, line 4, "diacetilactis" should be --diacetylactis--.

Column 4, after line 5 "Micrococcus varians NRRL-B-18051 (M-19)" should be inserted.

Column 4, line 9, "diacetilactis" should be --diacetylactis--.

Column 5, line 11 (Claim 1), "diacetilactis" should be --diacetylactis--.

Column 5, line 18 (Claim 2) "diacetilactis" should be --diacetylactis--.

UNITED STATES PATENT AND TRADEMARK OFFICE
CERTIFICATE OF CORRECTION

PATENT NO.  : 4,728,518

DATED       : March 1, 1988

INVENTOR(S) : Carlos F. Gonzalez, Mark A. Matrozza and Kelly B. Pratt

It is certified that error appears in the above—identified patent and that said Letters Patent is hereby corrected as shown below:

Column 6, line 5 (Claim 6) "diacetilactis" should be --diacetylactis--.

Column 6, line 13 (Claim 7) "diacetilactis" should be --diacetylactis--.

Column 6, line 22 (Claim 9) "diacetilactis" should be --diacetylactis--.

Signed and Sealed this

Fourth Day of October, 1988

Attest:

DONALD J. QUIGG

Attesting Officer

Commissioner of Patents and Trademarks